United States Patent [19]

Miller et al.

[11] 3,748,059
[45] July 24, 1973

[54] INLET STRUCTURE FOR TURBOMACHINE
[75] Inventors: Arthur J. Miller, Irwin; Robert A. Miller, Jeannette, both of Pa.
[73] Assignee: Carrier Corporation, Syracuse, N.Y.
[22] Filed: June 6, 1972
[21] Appl. No.: 260,091

[52] U.S. Cl.................. 415/136, 415/217, 415/139
[51] Int. Cl............................................... F01d 9/02
[58] Field of Search.................... 415/136, 138, 139, 415/216, 217

[56] References Cited
UNITED STATES PATENTS
3,078,071   2/1963   Henny et al. .................... 415/138
3,074,690   1/1963   Henny................................ 415/136

Primary Examiner—Henry F. Raduazo
Attorney—J. Raymond Curtin

[57] ABSTRACT

The nozzle ring is positioned on the inner end surface of the nose piece. A clamping member is formed with inner and outer spaced apart flanges. The inner flange is positioned on the surface of the nose piece and the flanges extend from a connecting portion toward the nozzle ring. The outer flange of the clamp member extends over a portion of the nozzle ring. A fastening member, such as a capscrew, extends through the clamp flanges and when tightened, serves to clamp the inner clamp flange tightly against the nose piece and surface and simultaneously the outer clamp flange yieldingly clamps the nozzle ring against the nose piece surface. The invention includes a discoidal heat shield. The peripheral marginal portion of the shield overlies the clamp member. The heat shield may be formed with tabs interlocking with the fastening screws to prevent the same from loosening.

5 Claims, 3 Drawing Figures

3,748,059

INLET STRUCTURE FOR TURBOMACHINE

BACKGROUND OF THE INVENTION

Due to the fact that turbomachines such as turbochargers are operated by the high temperature pulsating exhaust gases from the engine problems arise because of vibration and because of non-uniform growth of the parts due to expansion and contraction. The latter problem is particularly troublesome in prior machines in which the nozzle ring is fixedly bolted to the nose piece, such construction causes fractures in the parts. Various structures have been designed and incorporated in presently produced turbochargers, and such new designs have mainly overcome the problems referred to.

However, there are a very great number of turbochargers in use involving the bolted construction which, as stated, does not allow the nozzle ring to expand and contract relative to the nose piece. An example of such bolted constructin is shown in U.S. Pat. No. 3,476,987, issued Nov. 4, 1969.

This invention has as a particular object a structural arrangement for attaching the previously bolted nozzle ring to the nose piece in such manner that undue stresses, because of expansion and constraction, are not set up in the nose piece or the nozzle ring. The structure of the invention requires only a simple machine operation in the nozzle ring.

SUMMARY OF THE INVENTION

A clamping structure formed with inner and outer flanges extending in spaced relation from a connecting portion is positioned on the inner end surface of the nose piece. The clamping structure is positioned within the nozzle ring, also positioned on the nose piece surface, the inner flange is positioned against the nose piece surface and free end of the outer flange overlies the inner portion of the nozzle ring. Screw fasteners are provided for clamping the inner flange tightly against the nose piece surface. The normal spacing between the outer flange and the surface of the nose piece is slightly less than the thickness of the engaged portion of the nozzle ring whereby, when the inner flange of the clamp structure is in tight engagement with the nose piece surface, the outer flange yieldingly clamps the nozzle ring against the nose piece.

DESCRIPTION OF THE PREFERRED EMBODIMENT

Figure 1:
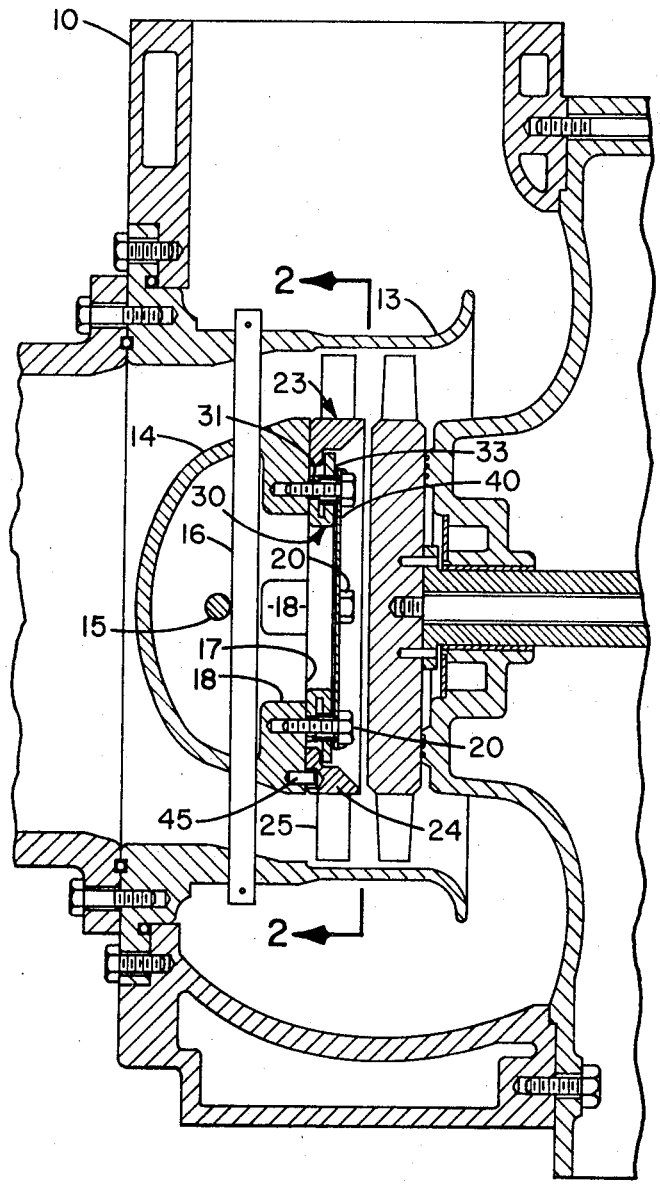
FIG. 1 is a vertical sectional view of the turbine portion of a turbocharger.
Figure 2:
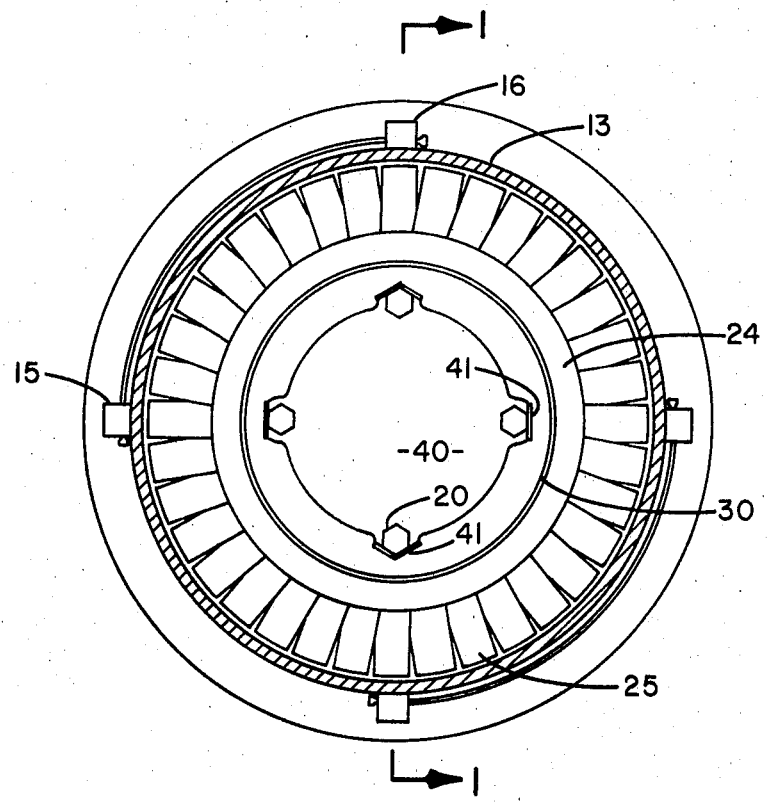
FIG. 2 is a view taken on line 2—2, FIG. 1.

The turbo portion of the machine shown in the drawings consists of a housing 10 having an open inlet in which is mounted a diffuser tube 13. A nose piece 14 is mounted in the diffuser tube by means of supporting cross bars 15, 16. The bar 15 is disposed normal to the bar 16. The bars extend through the nose piece and through the diffuser tube 13. With this arrangement, the nose piece is maintained in concentrically spaced relation to the diffuser tube 13 while permitted to expand and contract relatively thereto. The inner end of the nose piece 14 is formed with an annular surface 17 disposed in a plane normal to the axis of the nose piece and the diffuser tube. The nose piece is formed with inwardly extending bosses 18 which are provided with threaded apertures to receive screws 20. A nozzle ring 23 is positioned on the surface 17 and includes an annular portion 24 formed with integral nozzle blades 25. A circular flange 27 of reduced thickness extends inwardly from the annular portion 24.

Figure 3:
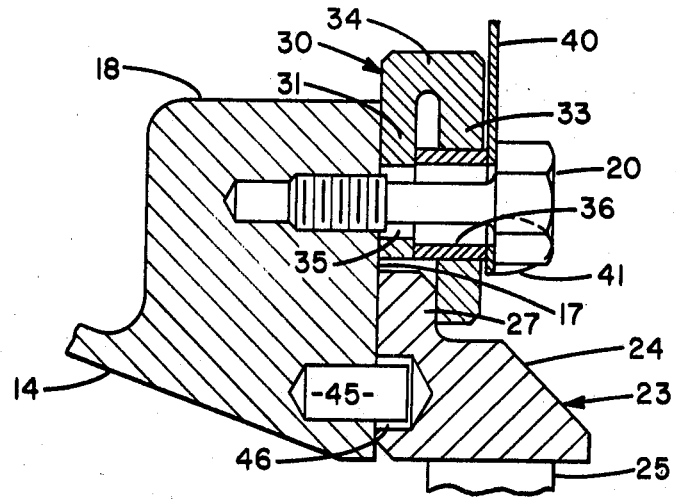
FIG. 3 is an enlarged sectional view of the lower clamp structure shown in FIG. 1.

A nozzle ring spring clamp clamping structure 30 is positioned on the nose piece surface 17 within the nozzle ring 23. The clamping structure is formed with inner and outer flanges 31, 33 extending in spaced parallel relation from a connecting portion 34 toward the nozzle ring. The inner flange 31 is shorter than the flange 33, the free end of the flange 31 terminates in spaced relation to the nozzle ring. The free end of the outer longer flange 33 overlaps the flange 27 on the nozzle ring. The inner flange 31 is formed with an aperture 35 dimensioned for clearance with the screw 20, see FIG. 3. The outer flange 33 is formed with the hole larger than the hole 35 in flange 31. The larger hole in the outer flange is dimensioned for clearance with a screw 20 having an enlarged outer neck portion to provide a shoulder abutting against the flange 31 to clamp it tightly against the nose piece surface 17. The head of the shoulder screw, when tightened, will be positioned outwardly from the outer flange 33 whereby that flange will yieldingly clamp the nozzle ring against the nose piece.

In the embodiment shown, a spacing sleeve 36 is positioned in the larger hole formed in the outer flange 33. The inner end of the sleeve 36 abuts against the flange 31 and the outer end of the sleeve extends outwardly a short distance beyond the flange 33. Insofar as the operation of the clamping structure is concerned, the use of the spacing sleeve 36 functions in the same manner as would the shoulder screw, as will be readily apparent.

The initial spacing between the flange 33 and the nose piece surface 17 is less than the thickness of the nozzle ring flange 27 whereby when the inner flange 31 is tightly affixed against the surface of the nose piece, the outer flange 33 of the spring clamp structure yieldingly clamps the nozzle ring against the nose piece as stated.

It will be apparent that the clamping structure may consist of a plurality of separate "U" shaped spring members. Preferably, as shown in the disclosed embodiment, the clamping structure consists of an annular member. In both arrangements it will be noted the connecting portion 34 is spaced inwardly from the bosses 18 better providing for the resilient action of the outer flange 33.

The clamping pressure is sufficient to prevent displacement of the nozzle ring during the operation of the turbocharger, but is not sufficient to prevent relative expansion and contraction between the nose piece and the nozzle ring. That is, the structure described allows unrestricted growth of the nozzle ring while it is securely clamped to the nose piece.

Preferably, a discoidal heat shield 40 is positioned with the peripheral marginal portion overlying the clamp members 30. This heat shield 40 serves to prevent undue temperature rise in the structure 30, such as might adversely affect the spring temper of the same. The shield 40 is positioned on the outer ends of the spacer sleeves 36, whereby the shield is spaced outwardly of the outer flange 33. The shield 40 may be formed with radially extending tabs 41 which may be folded up into engagement with the heads of the screws 20 to prevent the same from becoming loosened.

A dowel 45 may be mounted in the nose piece with an end portion extending into an aperture 46 formed in the confronting surface of the nozzle ring 23. The aperture 46 is dimensioned larger than the dowel pin. The pin serves to limit rotation of the nozzle ring should the holding power of the spring clamps 30 be exceeded due to an excessive gas load.

The nozzle ring 23 is limited in radial movement relative to the nose piece by the outer ends of the clamp flanges 31, 33 terminating in spaced relation to the nozzle ring. The clamping structure described functions to effectively clamp the nozzle ring to the nose piece in a manner overcoming the problems alluded to in connection with the prior art structure wherein the nozzle ring was fixedly attached to the nose piece by being bolted thereto. The structure of this invention only requires a simple machining operation on the nozzle ring now in conventional use to form the flange 27.

We claim:

1. A turbo machine comprising a casing, an inlet diffuser tube mounted in the casing, a nose piece mounted in said diffuser tube, said nose piece being formed with an inner annular end surface disposed in a plane normal to the axis of said diffuser tube, a nozzle ring positioned on said surface, a clamping structure for clamping said nozzle ring to said surface, said clamping structure being formed with inner and outer flanges extending in spaced parallel relation from a connecting portion toward said nozzle ring, said inner flange being positioned on said nose piece surface and terminating inwardly from said nozzle ring, said outer flange extending over a portion of said nozzle ring in engagement therewith, the normal spacing between said outer flange and said nose piece surface being less than the thickness of the engaged portion of said nozzle ring, the fastening means extending through said inner and outer flanges and having clearance with said outer flange, said fastening means threading into said nose piece surface and being operable to tightly clamp said inner flange against said nose piece surface, whereby said outer flange yieldingly moves said nozzle ring in clamping engagement with said inner nose piece surface.

2. A turbo machine as set forth in claim 1 and including a discoidal heat shield carried by said fastening means and overlying said clamping structure.

3. A turbo machine as set forth in claim 1 wherein said clamping structure includes an annular spring clamping member formed with said inner and outer spaced flanges extending from said connecting portion.

4. A turbo machine according to claim 3 wherein said fastening means consists of screws extending through said outer flange and being provided with means engaging said inner flange to clamp the same against the nose piece surface in tight engagement therewith, said outer flange having free clearance with said screw members.

5. A turbo machine as set forth in claim 3 wherein said inner and outer flanges of said annular clamping member are formed with aligned apertures, a spacing sleeve postioned in the aperture in said outer flange, the inner end of said sleeve abutting against said inner flange, the outer end of said sleeve extending outwardly from said outer flange and engaged by said fastening means.

* * * * *